United States Patent
Hu

(10) Patent No.: US 12,403,948 B2
(45) Date of Patent: Sep. 2, 2025

(54) FASTENING APPARATUS HAVING ROTATION LIMITING FUNCTION AND CHILD CARRIER HAVING THE SAME

(71) Applicant: Wonderland Switzerland AG, Steinhausen (CH)

(72) Inventor: Shoufeng Hu, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 497 days.

(21) Appl. No.: 17/751,696

(22) Filed: May 24, 2022

(65) Prior Publication Data
US 2022/0371643 A1 Nov. 24, 2022

(30) Foreign Application Priority Data

May 24, 2021 (CN) .......................... 202110567499.4

(51) Int. Cl.
*B62B 3/02* (2006.01)
*B62B 7/00* (2006.01)
(Continued)

(52) U.S. Cl.
CPC ................ *B62B 9/12* (2013.01); *B62B 7/008* (2013.01); *F16C 11/103* (2013.01)

(58) Field of Classification Search
CPC ........... F16C 11/103; B62B 9/12; B62B 7/008
See application file for complete search history.

(56) References Cited

U.S. PATENT DOCUMENTS

| 6,698,773 B2 * | 3/2004 | Hsia | ........................ B62B 9/245 |
| | | | 280/47.38 |
| 9,545,940 B2 | 1/2017 | Taylor | |

(Continued)

FOREIGN PATENT DOCUMENTS

| CN | 203780579 U | 8/2014 |
| CN | 203958251 U | * 11/2014 |

(Continued)

OTHER PUBLICATIONS

Office action mailed/issued on Dec. 5, 2023 for TW application No. 111119140, filing date: May 23, 2022, pp. 1-9., Dec. 5, 2023.

(Continued)

*Primary Examiner* — Jason D Shanske
*Assistant Examiner* — James J Triggs
(74) *Attorney, Agent, or Firm* — Winston Hsu

(57) ABSTRACT

A fastening apparatus includes: a base having a first sliding groove; a rotation member pivotally connected to the base and having at least two locking states, the rotation member has a second sliding groove; a locking member having a locked state and an unlocked state, in the locked state, the rotation member is located in both the first sliding groove and the second sliding groove; in the unlocked state, the locking member is withdrawn from the first sliding groove or the second sliding groove to allow the rotation member to rotate relative to the base; an elastic element configured to maintain the locking member in the locked state; and a releasing member configured to drive the locking member to move against an elastic force of the elastic element, such that the locking member is switched from the locked state to the unlocked state.

14 Claims, 8 Drawing Sheets

(51) Int. Cl.
  *B62B 9/12*   (2006.01)
  *F16C 11/10*  (2006.01)

(56) References Cited

U.S. PATENT DOCUMENTS

| | | | |
|---|---|---|---|
| 9,545,941 | B2 | 1/2017 | Pacella |
| 10,479,391 | B2 | 11/2019 | Haut |
| 11,805,920 | B2 | 11/2023 | Zhang |
| 2011/0175305 | A1 | 7/2011 | Chen |
| 2012/0292888 | A1 | 11/2012 | Lai |
| 2020/0391783 | A1* | 12/2020 | Zheng ................. B62B 9/20 |
| 2021/0070344 | A1* | 3/2021 | Guo .................... B62B 9/12 |
| 2024/0351626 | A1* | 10/2024 | Guo .................... B62B 9/12 |

FOREIGN PATENT DOCUMENTS

| | | | |
|---|---|---|---|
| CN | 105313940 A | | 2/2016 |
| CN | 105383538 A | | 3/2016 |
| CN | 106275040 A | | 1/2017 |
| CN | 109955884 A | | 7/2019 |
| CN | 209600326 U | | 11/2019 |
| CN | 110758533 A | | 2/2020 |
| CN | 112135765 A | | 12/2020 |
| CN | 112515407 A | | 3/2021 |
| CN | 112758159 A | | 5/2021 |
| GB | 2517288 B | | 5/2020 |
| TW | 201508184 A | * 3/2015 | ............. A47D 13/02 |

OTHER PUBLICATIONS

Office action mailed/issued on Jun. 4, 2024 for CN application No. 202110567499.4, filing date: May 24, 2021, pp. 1~10. ,Jun. 4, 2024.

Office action mailed/issued on Jul. 18, 2024 for TW application No. 111119140, filing date: May 23, 2022, pp. 1~4. ,Jul. 18, 2024.

Office action mailed/issued on Jul. 3, 2025 for TW application No. 111119140, filing date: May 23, 2022, pp. 1~13. Abstract.

* cited by examiner

FASTENING APPARATUS HAVING ROTATION LIMITING FUNCTION AND CHILD CARRIER HAVING THE SAME

BACKGROUND OF THE INVENTION

1. Field of the Invention

The present disclosure relates to a fastening apparatus and a child carrier having the same.

2. Description of the Prior Art

Double-seat stroller has two seats and can carry two children at the same time. Two seats of common double-seat strollers are arranged side by side, and two children sitting on the seats side by side may interact with each other during the travel. However, the two seats arranged side by side cause the width of the stroller to be excessive large. When the road is narrow, it will seriously hinder the normal passing of pedestrians on the road, causing the potential safety hazard. In another double-seat stroller, two seats are arranged up and down, i.e., one seat is above the other seat. Such a double-seat stroller makes full use of a longitudinal space of the stroller and greatly reduces the width of the stroller, thereby becoming increasingly popular among many users.

In some designs of double-seat strollers in which seats are arranged up and down, one seat may be removed to adapt to a situation that only one child is sitting on the seat. The bottom of a frame of the detachable seat is generally detachably connected to a fastening member of the stroller. After the seat is removed, if the fastening member cannot be folded, it will protrude toward a child sitting on the seat, which may cause injury to the child. In addition, the protruding fastening member also affects the appearance of the stroller and causes relatively large packaging volume of the stroller, resulting in an increase in the transportation costs.

SUMMARY OF THE INVENTION

According to various embodiments, a fastening apparatus and a child carrier having the same are provided.

A fastening apparatus includes: a base having a first sliding groove; a rotation member pivotally connected to the base and having a second sliding groove, wherein the rotation member has at least two locking states, wherein adjacent two locking states are spaced apart by a predetermined angle; a locking member having a locked state and an unlocked state, wherein in the locked state, the rotation member is in one of the at least two locking states, and the locking member is located in both the first sliding groove and the second sliding groove to limit rotation of the rotation member relative to the base; in the unlocked state, the locking member is withdrawn from the first sliding groove or the second sliding groove to allow the rotation member to rotate relative to the base, so as to switch the locking states of the rotation member; an elastic element operably connected to the locking member and configured to maintain the locking member in the locked state; and a releasing member operably connected to the locking member and configured to drive the locking member to move against an elastic force of the elastic element, such that the locking member is switched from the locked state to the unlocked state.

A child carrier includes: the aforementioned fastening apparatus; and a first frame configured to provide a first seat and a second frame configured to provide a second seat, wherein the second frame is detachably connected to the rotation member of the fastening apparatus.

The details of one or more embodiments of the present disclosure are set forth in the accompanying drawings and the description below. Other features, objects and advantages of the present disclosure will become apparent from the description, drawings and claims.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
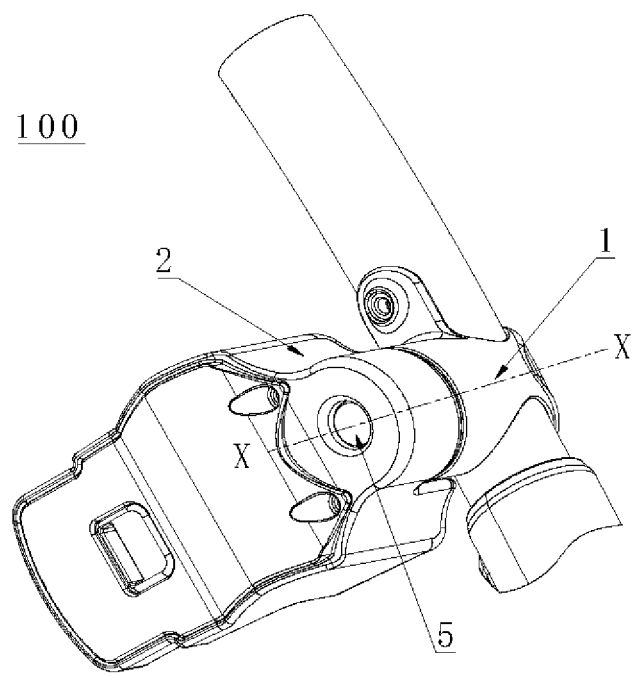
FIG. 1 is a perspective view of a fastening apparatus according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
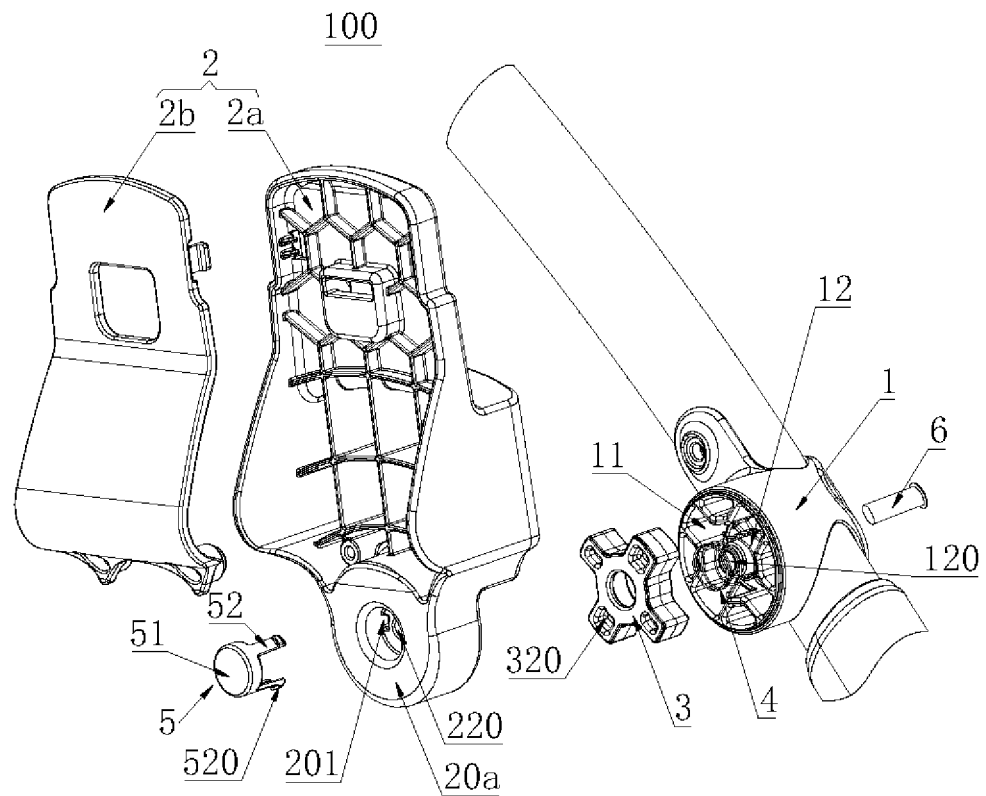
FIG. 2 is an exploded view of the fastening apparatus of FIG. 1.
Figure 3:
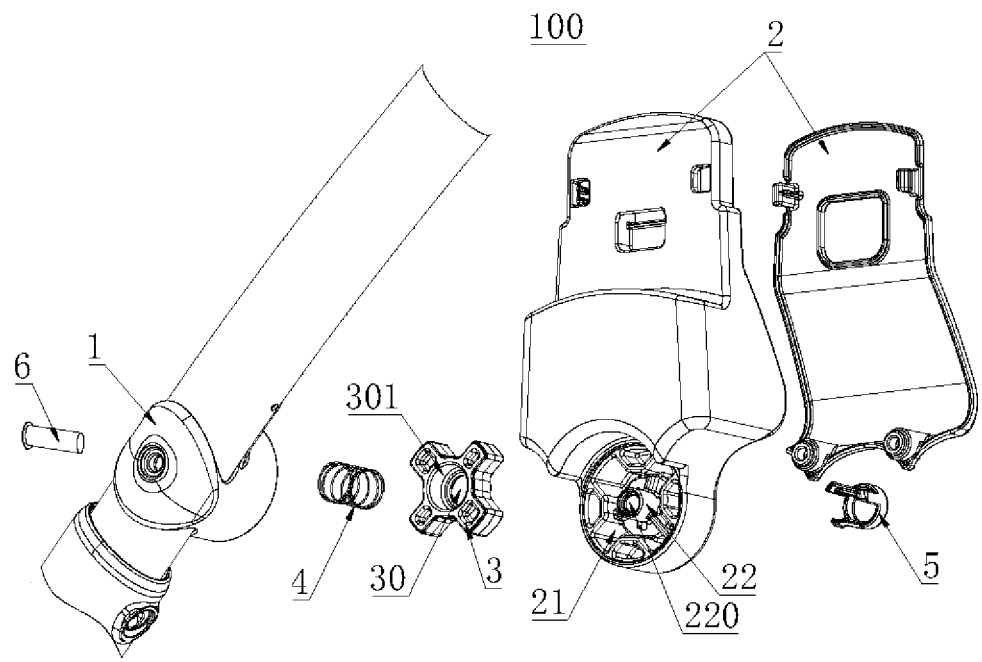
FIG. 3 is an exploded view of the fastening apparatus of FIG. 1 viewed from another aspect.

FIG. 1 to FIG. 3 show a fastening apparatus 100 having a rotation limiting function according to an embodiment. The fastening apparatus 100 may be applied to any suitable apparatus, for example, a child carrier, a supermarket trolley, or a pet carrying apparatus. Referring to FIG. 1 to FIG. 3, the fastening apparatus 100 may include a base 1, a rotation member 2, a locking member 3, an elastic element 4, and a releasing member 5.

The base 1 can be mounted at any suitable position of the aforementioned apparatus. The rotation member 2 is connected to the base 1, and the rotation member 2 can rotate around an axis X-X relative to the base 1, such that the rotation member 2 is pivotally connected to the base 1. In this embodiment, the rotation member 2 includes a main body 2a and a cover body 2b, and the cover body 2b is snapped onto the main body 2a. The rotation member 2 has at least two locking states during the rotation about the axis X-X. Adjacent two locking states are spaced apart by a predetermined angle, which angle can be set to any suitable value as required. When the rotation member 2 rotates to be any locking state, rotation of the rotation member 2 relative to the base 1 can be locked, such that the rotation member 2 is maintained at this position of the locking state. Since the rotation member 2 can rotate around the axis X-X and can be locked in different locking states as required, the rotation member 2 may have different states, so as to meet different user's requirements. For example, when the rotation member 2 is in one locking state, it may correspond to a use state of the rotation member 2. When the rotation member 2 is in another locking state, it may correspond to a folded state of the rotation member 2.

The base 1 has a first sliding groove 11, and the rotation member 2 has a second sliding groove 21. An opening of the first sliding groove 11 may be opposite to an opening of the second sliding groove 21. The locking member 3 can slide along the first sliding groove 11 and the second sliding groove 21, such that the locking member 3 has a locked state and an unlocked state. Structures of the first sliding groove 11, the second sliding groove 21, and the locking member 3 will be described in greater detail below.

Figure 7:
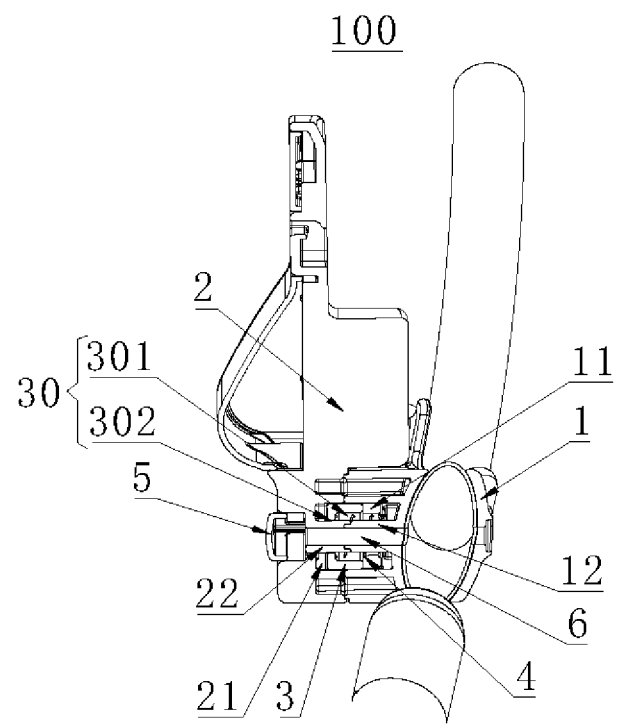
FIG. 7 is a cross-sectional view of the fastening apparatus of FIG. 1, where the locking member is in a locked state.
Figure 8:
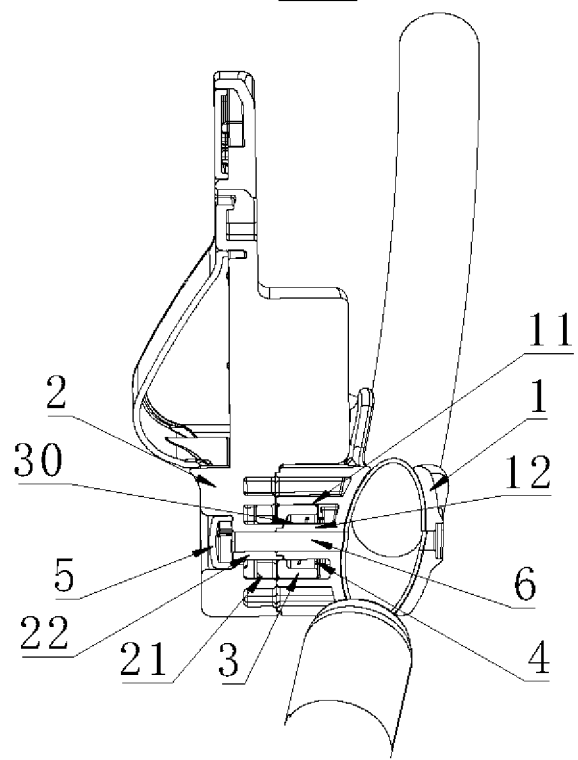
FIG. 8 is a cross-sectional view of the fastening apparatus of FIG. 1, where the locking member is in an unlocked state.

Referring to FIG. 7, in the locked state, the locking member 3 is located in the first sliding groove 11 and the second sliding groove 21 simultaneously, so as to limit the rotation of the rotation member 2 relative to the base 1, and the rotation member 2 is locked in any locking state. Referring to FIG. 8, in the unlocked state, the locking member 3 may be withdrawn from one of the first sliding groove 11 or the second sliding groove 21, and retract to the other one of the first sliding groove 11 or the second sliding groove 21. Specifically in the embodiment shown in FIG. 8, the locking member 3 is withdrawn from the second sliding groove 21 and completely retracts to the first sliding groove 11. In this case, the rotation member 2 is allowed to rotate relative to the base 1, and then the rotation member 2 is allowed to switch to another locking state. In other embodiments, the locking member 3 may be withdrawn from the first sliding groove 11 and retract to the second sliding groove 21, as long as the locking member 3 does not interfere with the rotation of the rotation member 2 in the unlocked state.

The elastic element 4 is operably connected to the locking member 3 and is configured to maintain the locking member 3 in the locked state, such that the rotation member 2 is maintained in the locking state. The releasing member 5 is operably connected to the locking member 3 and is configured to drive the locking member 3 to switch from the locked state to the unlocked state. It should be noted that, as used herein, when two components are operably connected, a relationship between the two components may be direct connection, indirect connection, direct contact, indirect abutting against, or the like. One of the two components moves or is moved, it may cause movement of the other component.

According to the fastening apparatus 100 provided in this embodiment, when the rotation member 2 is in one locking state, the elastic element 4 can maintain the locking member 3 in the locked state. When the locking state of the rotation member 2 needs to be switched, the releasing member 5 is operated, such that the releasing member 5 drives the locking member 3 to move against an elastic force of the elastic element 4, the locking member 3 is switched from the locked state to the unlocked state, and then the rotation member 2 can be twisted. For example, when the rotation member 2 is switched to an adjacent locking state, the releasing member 5 is released, and the elastic element 4 drives the locking member 3 to move, such that the locking member 3 is re-switched from the unlocked state to the locked state, and the rotation member 2 is reliably locked in another locking state.

In the fastening apparatus 100 of this embodiment, the rotation member 2 may be easily adjusted to different locking states, such that the position of the rotation member 2 may meet different requirements in different cases, thus avoiding interference or even damage to the user by the rotation member 2 in an inappropriate locking state.

Referring to FIG. 7 and FIG. 8, in some embodiments, the base 1 is pivotally connected to the rotation member 2 via a fastener 6. The locking member 3 is sleeved outside the fastener 6. The elastic element 4 and the releasing member 5 are configured to drive the locking member 3 to move in an axial direction of the fastener 6, respectively, such that the locking member 3 is switched between the locked state and the unlocked state. In this embodiment, the locking member 3 is sandwiched between the elastic element 4 and the releasing member 5, and the elastic element 4 and the releasing member 5 are configured to apply forces in opposite directions in the axial direction to the locking member 3. In other embodiments, the elastic element 4 and the releasing member 5 may be, for example, provided close to a same end of the locking member 3.

Figure 4:
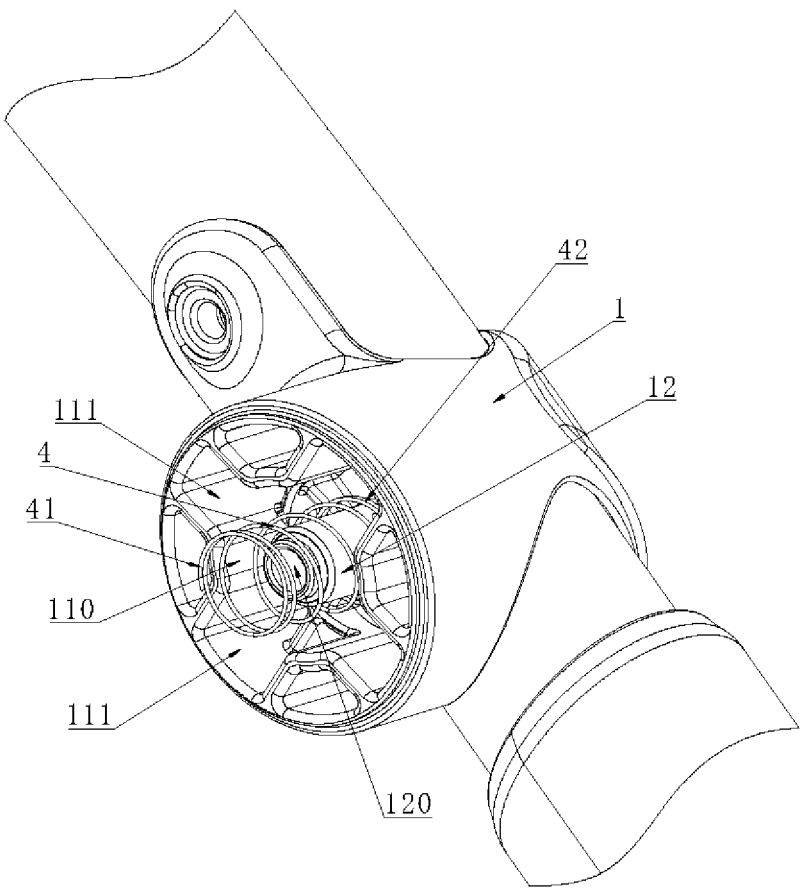
FIG. 4 is a perspective view of a base of FIG. 2.

Referring to FIG. 2, exemplary embodiments of the elastic element 4 and the releasing member 5 are shown. Specifically, the elastic element 4 is a spring sleeved outside the fastener 6. The elastic element 4 is accommodated in the first sliding groove 11 and is in contact with a first end of the locking member 3. Referring to FIG. 4, a first end 41 of the elastic element 4 is configured to be in contact with the locking member 3, and a second end 42 of the elastic element 4 is configured to be in contact with a bottom of the first sliding groove 11. The releasing member 5 is a button attached to the rotation member 2. A first end of the releasing member 5 is exposed to receive a pressing force of a user, and a second end of the releasing member 5 extends into the first sliding groove 21 to be in pressing contact with the locking member 3.

In some embodiments, the rotation member 2 has an inner side surface 20a away from the base 1, and the first end of the releasing member 5 corresponds to the inner side surface 20a of the rotation member 2. As such, when the fastening apparatus 100 is applied to a child stroller and a sitting position of a child is higher than the fastening apparatus 100, since the releasing member 5 is located in an inner side below the child, the child is not likely to touch the releasing member 5, which can effectively avoid the accident rotation of the rotation member 2 caused by the touch of the child. It should be understood that in another embodiment, the positions of the elastic element 4 and the releasing member 5 may be exchanged. For example, the elastic element 4 is accommodated in the second sliding groove 21, and the releasing member 5, such as the button, is attached to the base 1.

Figure 5:
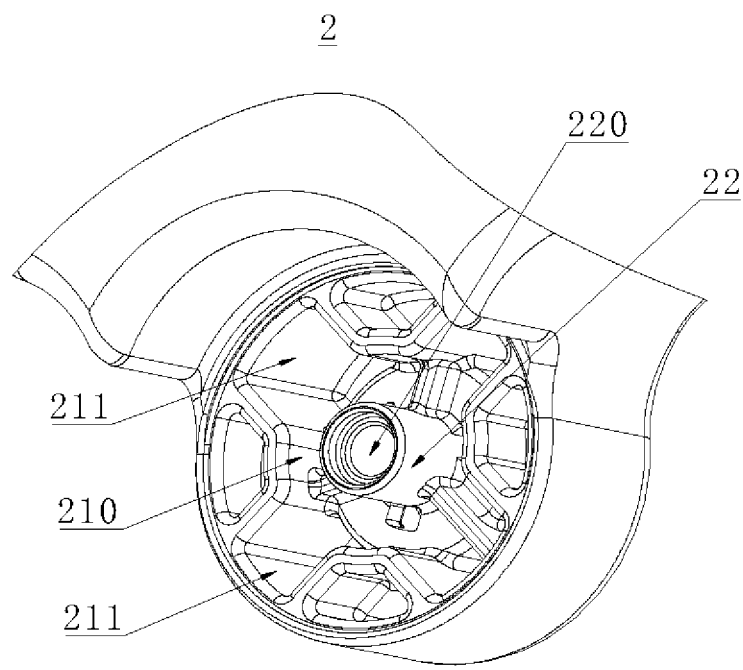
FIG. 5 is a partial enlarged view of a rotation member of FIG. 3.

Referring to FIG. 3, FIG. 4, and FIG. 5, in some embodiments, the base 1 includes a first sleeve portion 12. The first sleeve portion 12 is located in the first sliding groove 11. The rotation member 2 includes a second sleeve portion 22. The second sleeve portion 22 is located in the second sliding groove 21. An axis of the first sleeve portion 12 and an axis of the second sleeve portion 22 substantially coincide with the axis X-X. In some embodiments, the first sleeve portion 12 is provided with a first central hole 120, the second sleeve portion 22 is provided with a second central hole 220, and the fastener 6 is mounted in the first central hole 120 and the second central hole 220. The fastener 6 can prevent the rotation member 2 from accidentally falling off from the base 1 while ensuring the pivotal connection between the base 1 and the rotation member 2. The fastener 6 is, for example, a rivet, or may be a connecting column having one end provided with a head and the other end provided with an elastic clamp, or may be any other suitable component.

Figure 6:
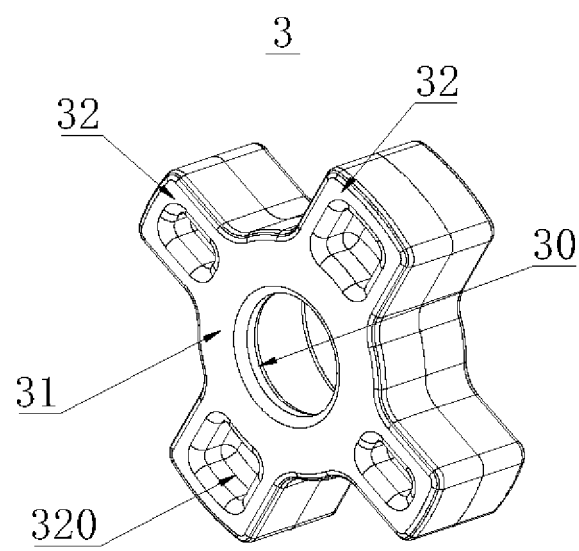
FIG. 6 is an enlarged view of a locking member of FIG. 3.

Referring to FIG. 6, FIG. 7, and FIG. 8, the locking member 3 has a central hole 30. The fastener 6, the first sleeve portion 12, and the second sleeve portion 22 extend into the central hole 30. The elastic element 4 is sleeved on the first sleeve portion 12. In some embodiments, the central hole 30 includes a first hole section 301 and a second hole section 302. The first hole section 301 may serve to accommodate an end portion of the elastic element 4, and the second hole section 302 can be slidably fitted with the first sleeve portion 12 and/or the second sleeve portion 22.

Referring to FIG. 7, in some embodiments, opposing end surfaces of the first sleeve portion 12 and the second sleeve portion 22 may be, for example, in concave-convex engagement with each other by using a step structure. As such, a structural strength of the fastening apparatus 100 is improved. In another embodiment, a gap may exist between the opposing end surfaces of the first sleeve portion 12 and the second sleeve portion 22, alternatively, the opposing end surfaces of the first sleeve portion 12 and the second sleeve portion 22 may be planes and abut against each other.

It should be noted that, although in this embodiment, the base 1 and the rotation member 2 are provided with the first sleeve portion 12 and the second sleeve portion 22, respectively, and the fastener 6 is mounted in the first sleeve portion 12 and the second sleeve portion 22, in another embodiment, the first sleeve portion 12 and the second sleeve portion 22 may be omitted. In this case, the elastic element 4 may be, for example, directly sleeved on the fastener 6, and the second hole section 302 may be slidably fitted with the fastener 6.

Referring to FIG. 2 again, in this embodiment, an exemplary embodiment of the releasing member 5 is further shown. The releasing member 5 includes a pressing portion 51 and a plurality of elastic arms 52 extending from the pressing portion 51. The pressing portion 51 forms the first end of the releasing member 5 and is configured to bear a pressing force. Free ends of the plurality of elastic arms 52 form the second end of the releasing member 5, and a hook 520 is provided on the free end of each elastic arm 52. The rotation member 2 is provided with a plurality of through holes 201 in communication with the second sliding groove 21. The free ends of the plurality of elastic arms 52 pass through the plurality of through holes 201, respectively, and then abut against the locking member 3, so as to apply a pressing force to the locking member 3. The hook 520 on the elastic arms 52 is engaged with an edge of the through holes 201, so as to prevent the releasing member 5 from accidentally falling off from the rotation member 2.

Referring to FIG. 4 to FIG. 6 again, exemplary structures of the first sliding groove 11, the second sliding groove 21, and the locking member 3 will be described in greater detail below.

The locking member 3 includes a central portion 31 and four protruding portions 32 protruding from the central portion 31 in a radial direction. The four protruding portions 32 are uniformly spaced apart by 90° in a circumferential direction. Recess portions 320 are provided on the protruding portions 32 to reduce weight. The central hole 30 is located in the central portion 31. The first sliding groove 11 includes a first central groove portion 110 and four first extending grooves 111 in communication with the first central groove portion 110. The second sliding groove 21 includes a second central groove portion 210 and four second extending grooves 211 in communication with the second central groove portion 210. The four first extending grooves 111 and the four second extending grooves 211 are also uniformly spaced apart by 90° in a circumferential direction. The central portion 31 is configured to be slidably fitted with the first central groove portion 110 and the second central groove portion 210. The protruding portion 32 is configured to be slidably fitted with the first extending groove 111 and the second extending groove 211.

Referring to FIG. 2 and FIG. 7, when the locking member 3 is located in both of the first sliding groove 11 and the second sliding groove 21, side walls of the protruding portions 32 abut against side walls of the first extending grooves 111 and side walls of the second extending grooves 211, such that the rotation of the rotation member 2 relative to the base 1 is limited. Referring to FIG. 8, after the locking member 3 completely retracts to the first sliding groove 11, the protruding portion 32 is disengaged from the second extending groove 211, and the rotation member 2 may rotate relative to the base 1. In the illustrated embodiment, the engagement of the locking member 3 with the second sliding groove 21 allows the rotation member 2 to have four locking states during rotation.

It should be understood that by changing configurations of the locking member 3, the first sliding groove 11, and/or the second sliding groove 21, the locking member 3 may have another number of locking states during rotation. For example, in some embodiments, three, five, or more protruding portions 32 may be provided. The plurality of protruding portions 32 are uniformly arranged at intervals around the central portion 31. Three, five, or more first extending grooves 111 and second extending grooves 211 are correspondingly provided to match the plurality of protruding portions 32.

Figure 9:
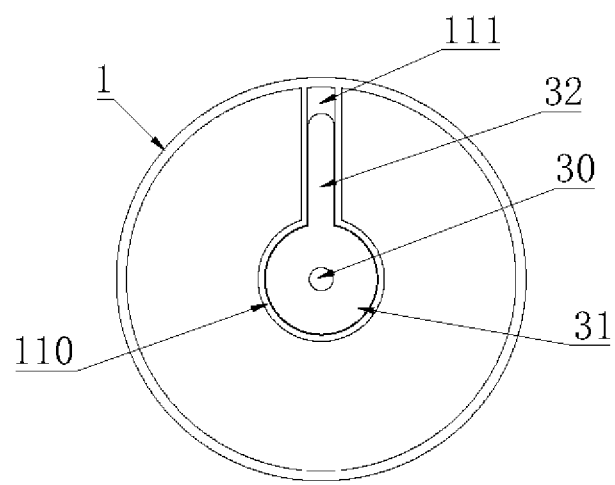
FIG. 9 is a top view of a base and a locking member according to an embodiment.
Figure 10:
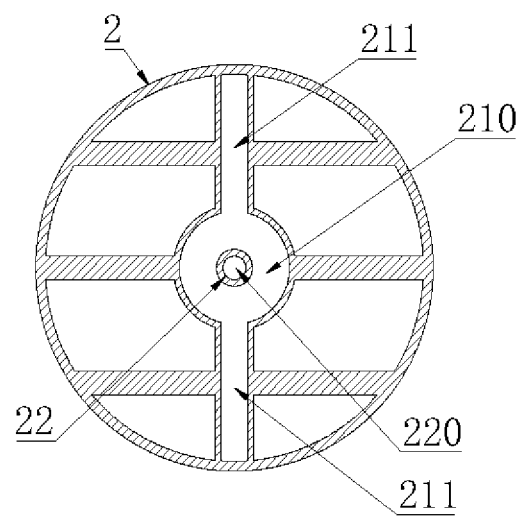
FIG. 10 is a cross-sectional view of a rotation member according to an embodiment.

Referring to FIG. 9 and FIG. 10, in some embodiments, only one protruding portion 32 is provided, one first extending groove 111 is provided, and two second extending grooves 211 are provided. It should be understood that the protruding portion 32 is matched with different second extending grooves 211, such that the rotation member 2 may have two locking states in the circumferential direction. In FIG. 10, two second extending grooves 211 are spaced apart by 180°. Therefore, the two locking states of the rotation member 2 are spaced apart by 180°. It should be understood that in another embodiment, the two second extending grooves 211 may be spaced apart by any suitable angles. In addition, in another embodiment, more than two second extending grooves 211 may further be provided.

Figure 11:
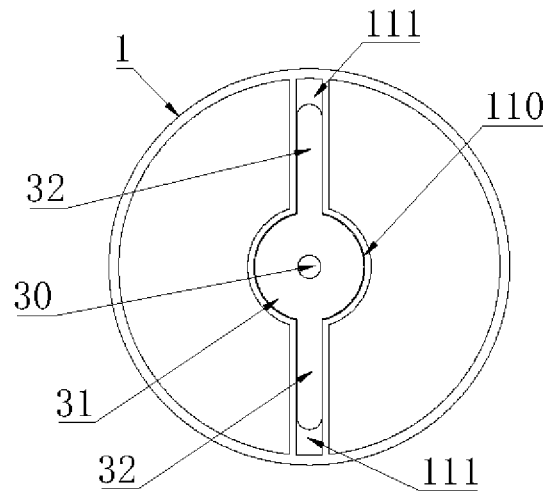
FIG. 11 is a top view of a base and a locking member according to another embodiment.

Referring to FIG. 11, in some embodiments, two protruding portions 32 may be provided, the two protruding portions 32 are spaced apart by 180° in the circumferential direction, and two first extending grooves 111 are also correspondingly provided and are spaced apart by 180°. The protruding portion 32 of such configuration may be matched with the second extending groove 211 of the second sliding groove 21 shown in FIG. 10, such that the rotation member 2 have two locking states spaced apart by 180° in the circumferential direction.

Figure 12:
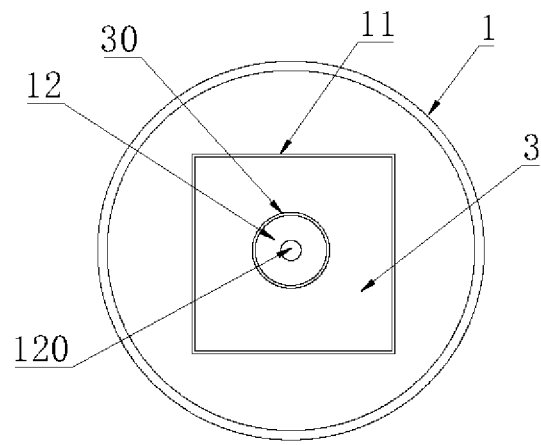
FIG. 12 is a top view of a base and a locking member according to yet another embodiment.
Figure 13:
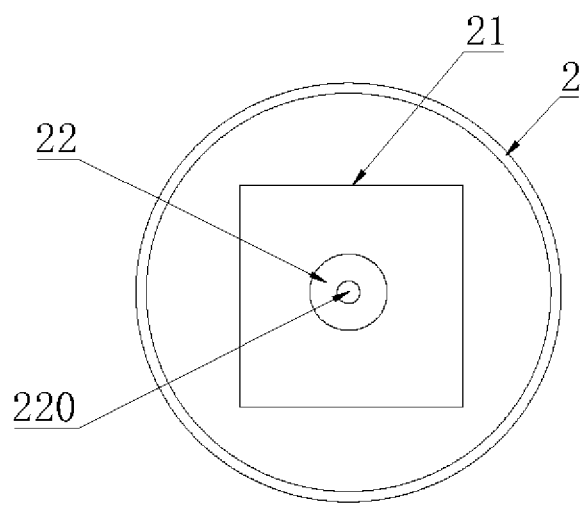
FIG. 13 is a top view of a rotation member according to another embodiment.

Referring to FIG. 12 and FIG. 13, in some embodiments, outer contours of sections of the first sliding groove 11 and the second sliding groove 21 may be shaped as first regular polygons, and an outer contour of a section of the locking member 3 is shaped as a second regular polygon corresponding to the first regular polygon. The first regular polygon and the second regular polygon may be, for example, regular triangles, squares, or regular pentagons. In FIG. 12 and FIG. 13, both the first regular polygon and the second regular polygon are the squares, such that the rotation member 2 has four locking states in the circumferential direction. Adjacent two locking states are spaced apart by 90°. It should be understood that the regular triangle allows the rotation member 2 to have three locking states in the circumferential direction, and the regular pentagon allows the rotation member 2 to have five locking states in the circumferential direction.

Figure 14:
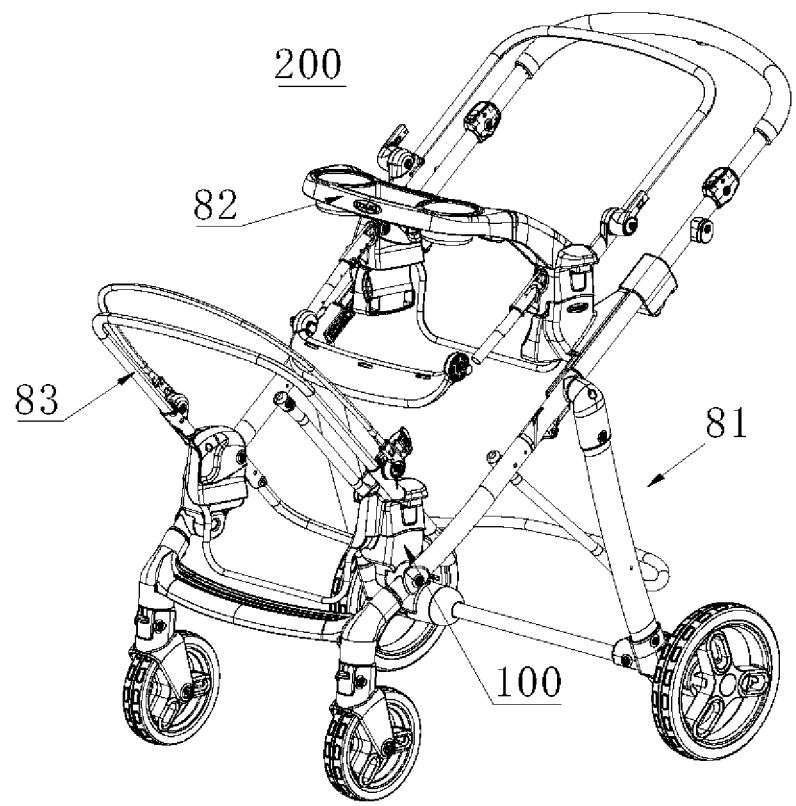
FIG. 14 is a perspective view of a child carrier according to an embodiment.
Figure 15:
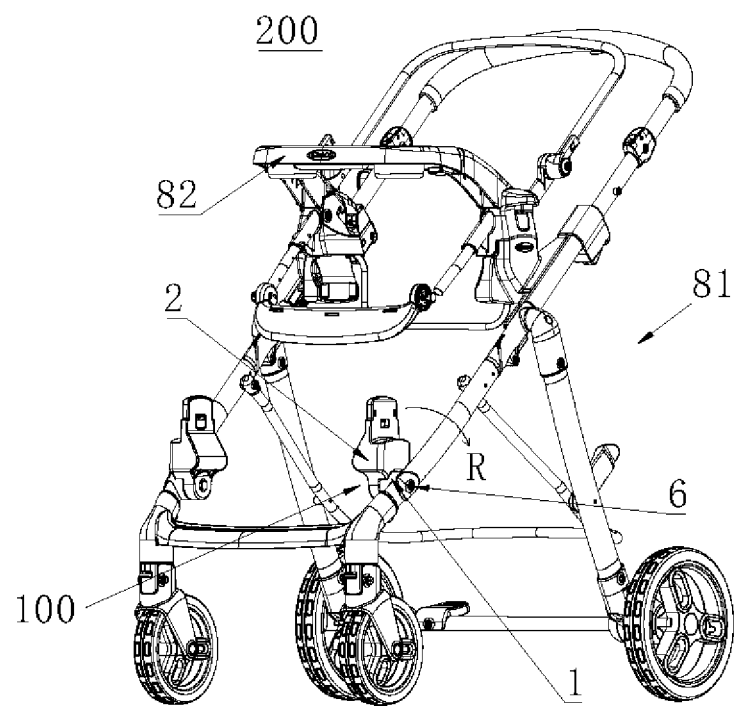
FIG. 15 is a perspective view of the child carrier of FIG. 14, where the rotation member is in a locking state.
Figure 16:
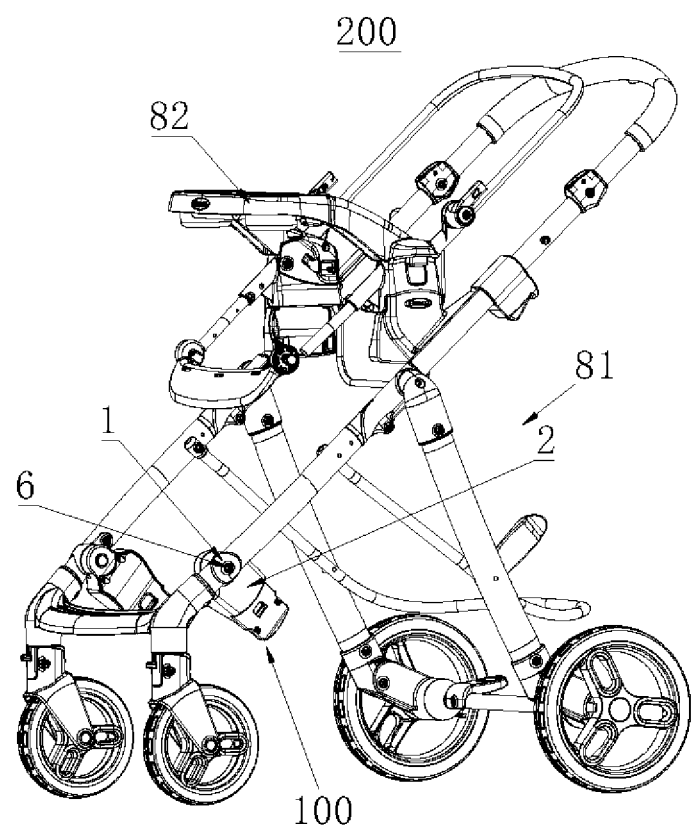
FIG. 16 is a perspective view of the child carrier of FIG. 14, where the rotation member is in another locking state.

FIG. 14 to FIG. 16 show a child carrier 200 according to an embodiment. The child carrier 200 includes the fastening apparatus 100 described in the foregoing embodiments. The child carrier 200 may be, for example, a double-seat child stroller. It should be understood that the application range of the fastening apparatus 100 is not limited to the child carrier and the double-seat child stroller and may be applied to any suitable field.

Referring to FIG. 14, the child carrier 200 includes a support frame 81, a first frame 82 and a second frame 83 connected to the support frame 81. Wheels are provided at ends of the support frame 81. The first frame 82 is arranged upward and provides a first seat for a child to ride, and the second frame 83 is arranged downward and provides a second seat for another child to ride. The base 1 of the fastening apparatus 100 is mounted on the support frame 81, and the second frame 83 is detachably connected to the rotation member 2 of the fastening apparatus 100. In this case, the rotation member 2 is locked in one locking state, and the second seat can be used normally.

Referring to FIG. 15, when only one child rides in the child carrier 200, the second frame 83 may be removed from the support frame 81. If the position of the rotation member 2 is not changed, the rotation member 2 may collide with a leg of the child. In this case, the releasing member 5 may be operated to rotate the rotation member 2 to another locking state in a direction denoted by an arrow R. Referring to FIG. 16, when the rotation member 2 is switched to another locking state, the rotation member 2 can be in a retracted state. In this case, the rotation member 2 is far away from the leg of the child and will not collide with the leg. In another embodiment, the first frame 82 is detachably connected to the rotation member 2 of the fastening apparatus 100; in that case, the first frame 82 may be removed from the support frame 81 when only one child rides in the child carrier 200.

After the second frame 83 is removed from the child carrier 200, the fastening apparatus 100 may be folded, such that the fastening apparatus 100 does not protrude significantly from the child carrier 200. As such, on one hand, it is not easy to cause injury to children, and on the other hand, the packaging volume of the entire child carrier 200 can be reduced to reduce transportation costs. The folded fastening apparatus 100 can make the overall appearance of the child carrier 200 simple and neat, which helps to improve the overall aesthetics of the child carrier 200. In addition, by providing the locking member 3 and the elastic element 4, the fastening apparatus 100 can be well limited and locked in the use state and the folded state, thereby ensuring the stability of the fastening apparatus 100 during use and after being folded. In addition, the releasing member 5 is operated to rotate the rotation member 2, such that the rotation member 2 can be easily switched between different locking states with a simple and easy switching operation, thereby achieving good user experience and improving user satisfaction. In addition, the first end of the releasing member 5 is located in an inner side of the child carrier 200, which can effectively avoid accidental rotation of the second frame 83 in a use state caused by the touch of the child.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of the present disclosure, and their description is specific and detailed, but cannot therefore be understood as a limitation to the patent scope of the present invention. It should be noted that, a person of ordinary skill in the art may further make some variations and improvements without departing from the concept of the present invention, and the variations and improvements belong to the protection scope of the present invention. Therefore, the protection scope of the patent of the present invention shall be topic to the claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fastening apparatus, comprising:
a base having a first sliding groove;
a rotation member pivotally connected to the base and having a second sliding groove, wherein the rotation member has at least two locking states, wherein the at least two locking states are adjacent and spaced apart by a predetermined angle;
a locking member having a locked state and an unlocked state, wherein in the locked state, the rotation member is in one of the at least two locking states, and the locking member is located in both the first sliding groove and the second sliding groove to limit rotation of the rotation member relative to the base; in the unlocked state, the locking member is withdrawn from the first sliding groove or the second sliding groove to allow the rotation member to rotate relative to the base, so as to switch the locking states of the rotation member;

an elastic element operably connected to the locking member and configured to maintain the locking member in the locked state; and a releasing member operably connected to the locking member and configured to drive the locking member to move against an elastic force of the elastic element, such that the locking member is switched from the locked state to the unlocked state;

wherein the locking member comprises a central portion and at least one protruding portion that protrudes from the central portion in a radial direction, the first sliding groove comprises a first central groove portion and at least one first extending groove in communication with the first central groove portion, the second sliding groove comprises a second central groove portion and at least one second extending groove in communication with the second central groove portion, the at least one first extending groove is at least two first extending grooves, and/or the at least one second extending groove is at least two second extending grooves, the central portion is slidably fitted with the first central groove portion and the second central groove portion, and the at least one protruding portion is slidably fitted with the at least one first extending groove and the at least one second extending groove.

2. The fastening apparatus according to claim 1, wherein outer contours of sections of the first sliding groove and the second sliding groove are shaped as a first polygon; and an outer contour of a section of the locking member is shaped as a second polygon corresponding to the first polygon.

3. The fastening apparatus according to claim 1, wherein the at least one protruding portion is a plurality of protruding portions are provided, and the plurality of protruding portions are uniformly arranged at intervals around the central portion, and the at least one first extending groove is a plurality of first extending grooves and the at least one second extending groove is a plurality of second extending grooves to match the plurality of protruding portions.

4. The fastening apparatus according to claim 1, wherein the at least one protruding portion is one protruding portion and the at least one first extending groove is one first extending groove, and the at least one second extending groove is two or more second extending grooves.

5. The fastening apparatus according to claim 1, wherein the base is pivotally connected to the rotation member via a fastener, the locking member is sleeved outside the fastener, and the elastic element and the releasing member are configured to drive the locking member to move in an axial direction of the fastener, respectively, such that the locking member is switched between the locked state and the unlocked state.

6. The fastening apparatus according to claim 2, wherein the base is pivotally connected to the rotation member via a fastener, the locking member is sleeved outside the fastener, and the elastic element and the releasing member are configured to drive the locking member to move in an axial direction of the fastener, respectively, such that the locking member is switched between the locked state and the unlocked state.

7. The fastening apparatus according to claim 3, wherein the base is pivotally connected to the rotation member via a fastener, the locking member is sleeved outside the fastener, and the elastic element and the releasing member are configured to drive the locking member to move in an axial direction of the fastener, respectively, such that the locking member is switched between the locked state and the unlocked state.

8. The fastening apparatus according to claim 4, wherein the base is pivotally connected to the rotation member via a fastener, the locking member is sleeved outside the fastener, and the elastic element and the releasing member are configured to drive the locking member to move in an axial direction of the fastener, respectively, such that the locking member is switched between the locked state and the unlocked state.

9. The fastening apparatus according to claim 5, wherein the locking member is located between the elastic element and the releasing member, the elastic element is accommodated in the first sliding groove or the second sliding groove, and the releasing member is attached to the rotation member or the base.

10. The fastening apparatus according to claim 9, wherein the base comprises a first sleeve portion located in the first sliding groove, the rotation member comprises a second sleeve portion located in the second sliding groove, the fastener is mounted in the first sleeve portion and the second sleeve portion, and the locking member is sleeved outside the first sleeve portion or the second sleeve portion.

11. The fastening apparatus according to claim 9, wherein the releasing member is a button, a first end of the releasing member is configured to receive a force, and a second end of the releasing member is in contact with the locking member.

12. The fastening apparatus according to claim 11, wherein the rotation member comprises an inner side surface away from the base, the releasing member is attached to the rotation member, and the first end of the releasing member corresponds to the inner side surface of the rotation member.

13. A child carrier comprising:
the fastening apparatus according to claim 1; and
a first frame configured to provide a first seat and a second frame configured to provide a second seat, wherein at least one of the first frame and the second frame is detachably connected to the rotation member of the fastening apparatus.

14. The child carrier according to claim 13, wherein the child carrier is a child stroller.

* * * * *